United States Patent [19]

Flaherty, Jr. et al.

[11] 4,126,579

[45] Nov. 21, 1978

[54] HYDROCARBON CONVERSION CATALYST MANUFACTURE

[75] Inventors: Theodore V. Flaherty, Jr., Glen Burnie; Richard J. Nozemack, Lutherville; Hanson L. Guidry, Baltimore, all of Md.

[73] Assignee: W. R. Grace & Co., New York, N.Y.

[21] Appl. No.: 814,819

[22] Filed: Jul. 12, 1977

Related U.S. Application Data

[63] Continuation-in-part of Ser. No. 780,143, Mar. 22, 1977, abandoned, which is a continuation-in-part of Ser. No. 696,983, Jun. 7, 1976, abandoned.

[51] Int. Cl.$^2$ .......................... B01J 29/06; B01J 37/00
[52] U.S. Cl. .................................. 252/455 Z; 252/448

[58] Field of Search ........................... 252/455 Z, 448

[56] References Cited

U.S. PATENT DOCUMENTS

3,867,308  2/1975  Elliott, Jr. ........................ 252/455 Z

*Primary Examiner*—Carl Dees
*Attorney, Agent, or Firm*—Arthur P. Savage

[57] ABSTRACT

A process for preparing a silica gel bound zeolite containing catalyst by preparing an acidic silica sol and alkaline zeolite slurry feed streams, rapidly and homogeneously mixing the streams to form a rapidly gelling mixture, and spraying the mixture to produce gelled particles of catalyst.

8 Claims, 3 Drawing Figures

HYDROCARBON CONVERSION CATALYST MANUFACTURE

This application is a continuation-in-part of our application U.S. Ser. No. 780,143 filed Mar. 22, 1977, which is a continuation-in-part of U.S. Ser. No. 696,983 filed June 7, 1976 and both now abandoned.

BACKGROUND OF THE INVENTION

Fluidized hydrocarbon conversion catalysts which contain crystalline aluminosilicates, principally faujasitic aluminosilicates (Type X and Type Y zeolites) have been commercially available for many years. These fluidized catalysts have been prepared by a variety of techniques in which the synthetic faujasite is prepared as a substantially pure compound and is then added to binding type materials such as silica or silica-alumina hydrogels. Clay or a mixture of clay and amorphous silica-alumina hydrogels may also be added in the preparation of these catalysts.

U.S. Pat. No. 3,867,308 to Elliott describes a process for preparing a hydrocarbon cracking catalyst in fluidized form by preparing an acid silica sol, adding clay and an acidified slurry of zeolite to the sol, spray drying before gellation occurs and washing the catalyst.

U.S. Pat. No. 2,384,946 to Marisic describes a method for preparing amorphous hydrogel particles which have catalytic cracking activity wherein a rapidly gelling silica hydrosol is sprayed into a fluid medium such as oil or air, and the sprayed sol particles gel or set to form particles of hydrogel.

U.S. Pat. No. 2,428,895 to Shoeld discloses a method for making silica-alumina gels wherein separate streams of alkali metal silicate and aluminum sulfate are mixed upon a rotating surface and the reaction product is centrifugally dispersed in the form of gel particles.

While the above noted Marisic and Shoeld patents disclose the preparation of amorphous hydrogel catalysts by the spray forming of rapidly gelling silica and/or alumina sols, these references do not disclose the preparation of catalysts which contain substantial quantities of zeolite and/or clay solids. The Elliott patent does not disclose a process wherein a rapidly gelling catalyst mixture is formed by spray atomization of a rapidly gelling mixture of acidic silica sol and basic zeolite slurry.

BRIEF DESCRIPTION OF THE INVENTION

We have found that a hydrocarbon conversion catalyst can be prepared in fluidized form by preparing acidic and alkaline feed streams containing the components and atomizing, i.e. spraying, the resultant mixture which rapidly gels to form discrete catalyst particles. In a preferred embodiment the catalyst is prepared by preparing a silica sol by adjusting the pH of a sodium silicate solution to about 0.5 to 3.3 and preferably 1.0 to 3.0, with a mineral acid, separately preparing a basic zeolite component by the addition of faujasite to sodium silicate solution with or without clay. The pH of this faujasite containing basic component is above 10, and preferably 10.5 to 14. The two components are then mixed, and immediately sprayed and gelled to prepare gelled particles in the form of microspheres.

During the atomization step, the catalyst particles gel. While some drying of the microspheres may take place during the atomization step, drying is not required and will occur after gellation of the particles has taken place. It is contemplated that drying the catalyst particle atomization; i.e. forming step, and substantially complete gellation of the particles takes place within about 0.5 to 30 seconds. The product is dried at temperatures of −5° to 150° C., collected, washed free of soluble salts and, if desired, base exchanged with a rare earth solution to stabilize the zeolite.

The advantages of this technique are as follows: In standard catalyst manufacture the microspheres are formed by spray drying i.e. removal of substantial quantities of water from the particles. Normally, dilute spray drying is performed on solutions that require significant quantities of hot gas to dry the water vapor in the particle forming step. Since our product does not require drying during the atomization forming step, little energy is expended during this step of our process. Furthermore, since particle formation may be carried out at relatively low temperatures, removal of sodium is facilitated and a product with higher chemical purity is recovered from a subsequent washing step.

DETAILED DESCRIPTION OF THE INVENTION

The first step in our process is the preparation of the acidic silica sol and basic zeolite slurry components.

The silica sol component is prepared by mixing sodium silicate with water and rapidly mixing with acid to provide a sol which comprises from about 0.5 to 0.6% by weight $Na_2O$ and sufficient acid to provide pH of between about 0.5 to 3.3 and preferably of between 1.0 and 3.0. Typically, the sol is prepared by combining commercially available 40° Be 3.25 $Na_2O \cdot SiO_2$ solution with sulfuric acid solution having a concentration of 9 to 36% by weight $H_2SO_4$. Optionally, the sol may be combined with from about 15 to 45% by weight clay. The sol will contain from about 35 to 47% by weight total solids and the remainder water.

The basic zeolite slurry component is made up by mixing the desired quantities of zeolite in the sodium form with a sufficient quantity of sodium silicate solution (typically 40° Be) and water to give a product having the desired pH. Clay may be added to the basic zeolite slurry component if desired. The pH of the zeolite slurry component is maintained above about 10 and preferably at between 10.5 and 14. The slurry component will contain from about 10 to 25% by weight sodium silicate, from about 10 to 17% by weight zeolite, and optionally from about 25 to 40% by weight clay and the balance water. The total solids content of the zeolite containing basic slurry ranges from about 33 to 46% by weight.

In the next step of our process the two streams are mixed instantaneously and homogeneously in amounts wherein from about 1.5 to 7.5 parts by weight of the above defined sol component is mixed with each part by weight of zeolite containing basic slurry, and the mixture is atomized, i.e. sprayed into a gaseous atmosphere such as air and/or steam having a temperature of 25° to 300° F. A water slurry of the spray formed product has a pH of about 3.0 to 10.0.

It is critical to successful operation of our process that the mixing may take place rapidly. A modified commercially available air atomizer can be used for feeding the two components into the nozzle at pressures of about 90 to 150 p.s.i. and maintaining the air in the nozzle at about 80 to 90 p.s.i., preferably 81 p.s.i.

Another method of achieving the instantaneously mixing of the two streams is by use of a commercially available spray machine and atomizing the particles on the revolving wheel. In one suitable embodiment the two feed slurries are added to the machine at a pressure of about 20 to 30 p.s.i., preferably about 25 p.s.i. (neglecting head loss in the transfer) and the wheel is maintained at a speed of 21000 rpm. A modification of the scroll plate element was necessary to accomodate independent feed stream.

Although our invention is described as a preferred embodiment any gellable inorganic component such as alum, silica-alumina mixtures, etc. with an inorganic gellation promotor component as for example such as sodium aluminate, sodium hydroxide, ammonium hydroxide, etc. give satisfactory results.

As pointed out previously, essential features of the process are the pH control of the sol and the zeolite mixtures. In addition, the slurries to be fed to the atomizing and mixing equipment must be sufficient fluid to be handled easily. In preparing the sol component a solution of sodium silicate containing about 5-28% $SiO_2$ gives satisfactory results. The sulfuric acid used must be fairly dilute, about 2.1 to 14.2 normal, (10°-40° Be) preferably about 18° Be.

When clay is added it is preferable to add the clay to both the acid sol component and the basic zeolite component.

The catalysts prepared by way of the present invention contain on a dry basis from about 10 to 35% by weight zeolite, from about 10 to 71% by weight clay, and from about 15 to 38% by weight inorganic oxide sol binder. At the time the catalysts are spray formed and before any substantial drying has taken place, the compositions will contain from about 49 to 60% water. After washing and ion exchange, the water content of the catalyst is lowered to a level of from about 0 to 15% by weight by drying at a temperature of about 150° to 300° C. The catalysts have a particle size range of from about 10 to 100 microns.

DESCRIPTION OF THE DRAWINGS

Having described the invention reference is now made to the schematic drawings in order to provide a better understanding of the present invention.

It is to be understood that the drawings are shown only in such details as are necessary for understanding of the invention and that various items such as valves, instrumentation and other process equipment and control means have been omitted therefrom for the sake of simplicity.

Referring now to FIG. 1, FIG. 1 is a cross-section of a conventional mixing nozzle. The nozzle 10 has three orifices 11, 12, and 13, a mixing area 14, and an exit 15.

Figure 1:
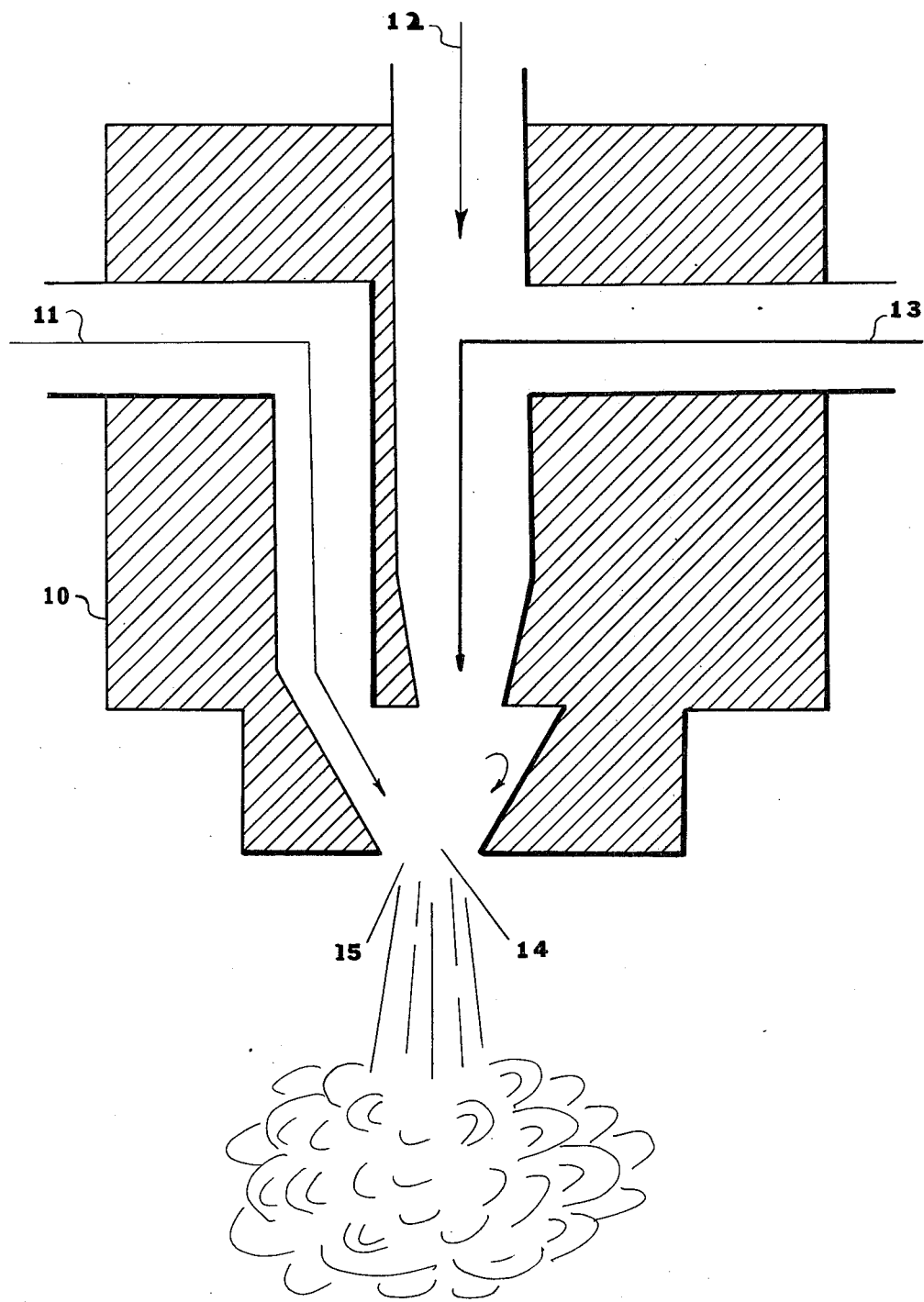
FIG. 1 is a cross-section view of the mixing nozzle showing the method of mixing the two solutions with ambient air.

In operation of the preferred embodiment the acid sol is fed through orifice 12 at a pressure of 60 to 75 lbs./sq. in. The alkaline solution containing the zeolite is fed through orifice 13 at a pressure of 60 to 75 lbs./sq. in. The two solutions are mixed in the mixing area 14 and are contacted with ambient air fed through orifice 11 maintained at a constant pressure of 81 lbs./sq. in. The microspheres set almost instantaneously to form discrete particles and are expelled from the orifice 15 to the conventional collection unit. Complete gellation of the particle after initial formation takes place within about 0.5 to 30 seconds.

Figure 2:
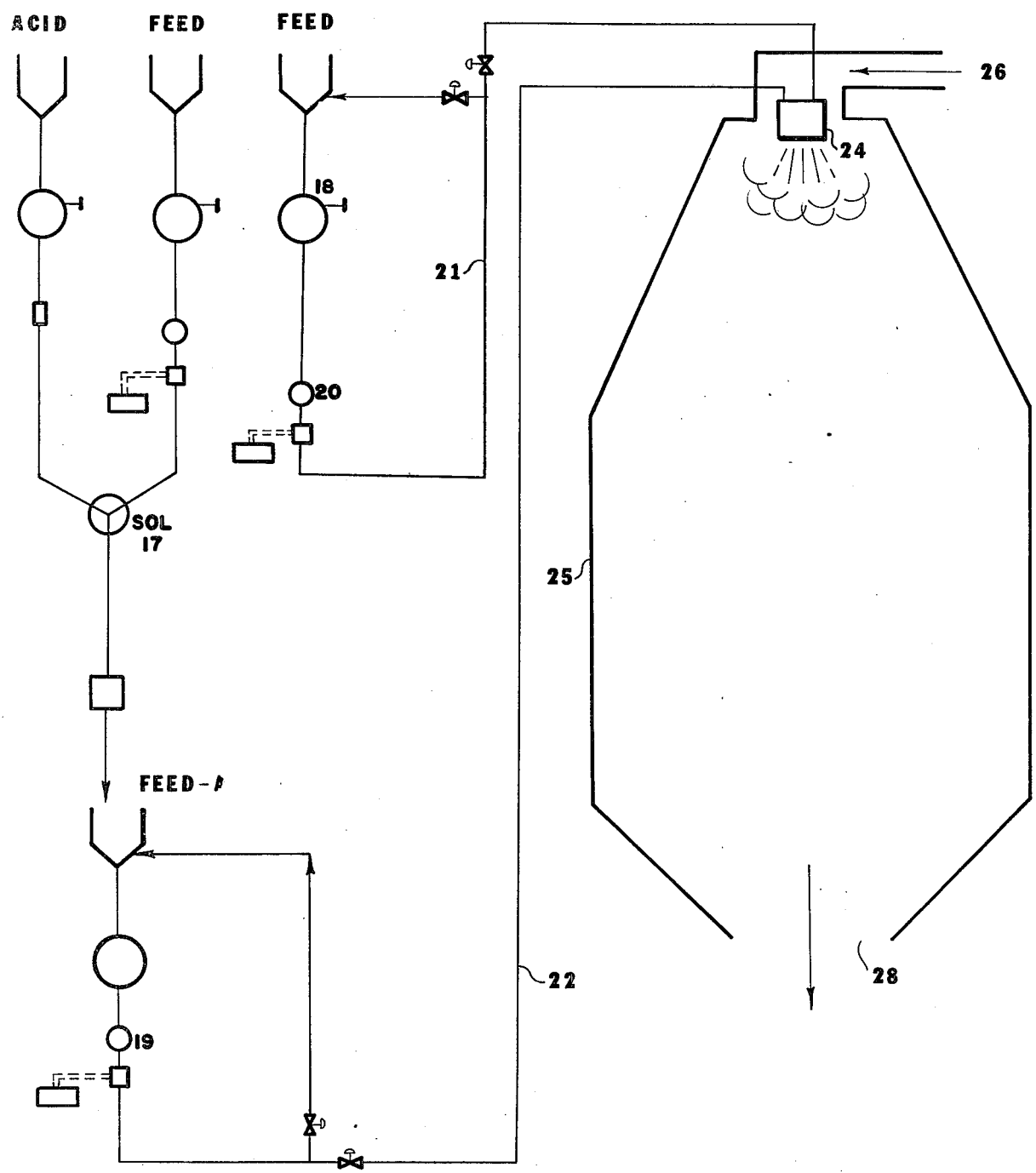
FIG. 2 is a cross-section view of the pilot plant apparatus in which the spray machine with revolving disc is set up in a conventional spray drier.

Referring now to FIG. 2 showing another pilot plant apparatus for preparation of our novel catalyst. The acid sol is fed through pump 17 and the alkaline slurry containing the sodium silicate and zeolite is fed through pump 18 maintained at pressures of 55 lbs./sq. in. and monitored by pressure gauges 19 and 20. The slurries move through the lines 21 and 22 to the spray machine where they are rapidly mixed and are discharged from the wheel 24 rotating at a speed of 21000 revolutions per minute. The microspheres formed drop through the spray drier 25 under the pressure of air at ambient temperatures fed to the unit through lines 26. The product falls freely through the spray drier 25 and is collected at the product collection area 28.

Figure 3:
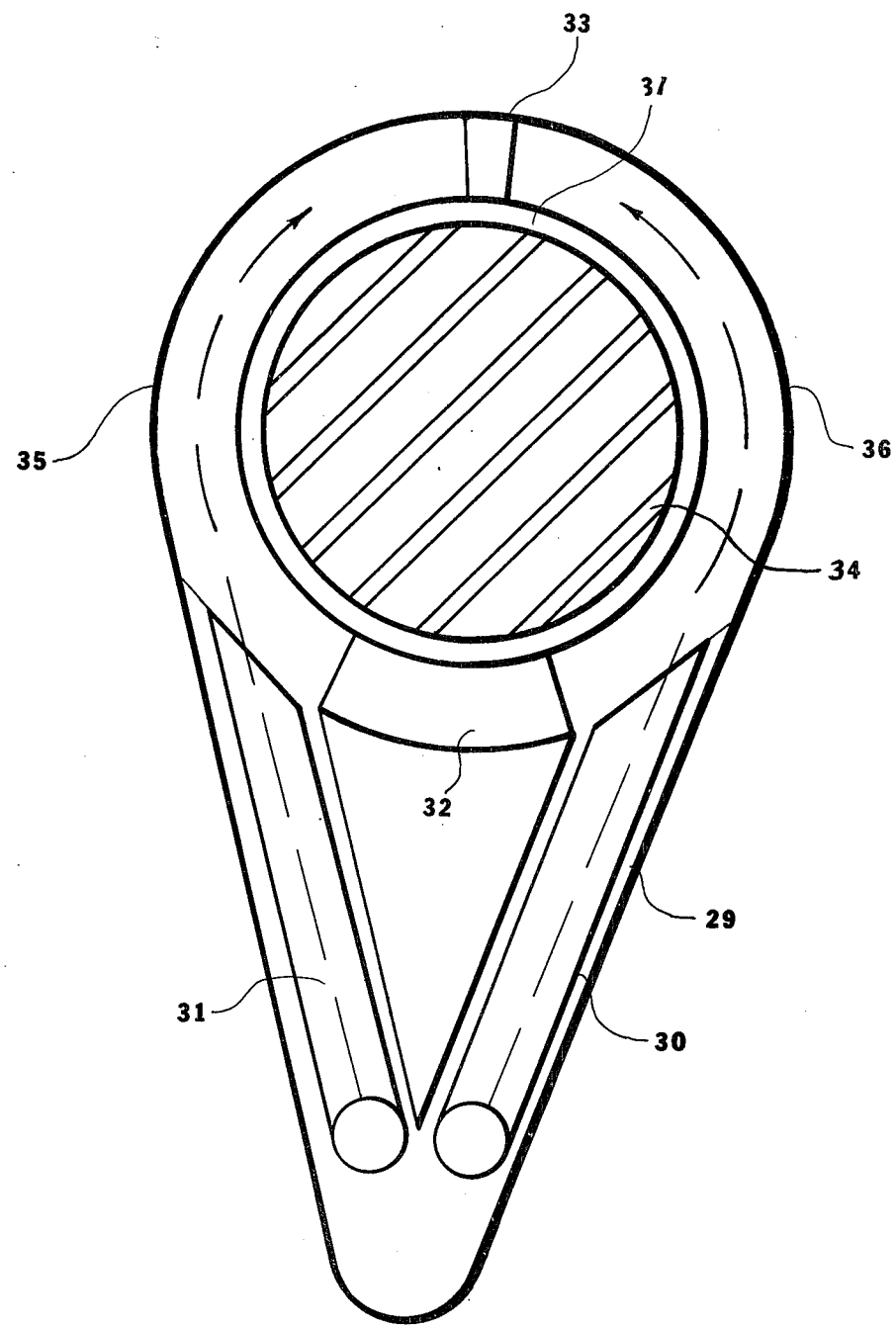
FIG. 3 is a top view of the scroll plate showing modifications of the plate for use in the apparatus shown in FIG. 2.

FIG. 3 is a top view of the scroll plate showing modification of this portion of the spraying machine to accomodate the feed line 30 for feeding the sol component and line 31 for feeding the zeolite component. The scroll plate has been modified by the addition of dams 32 and 33 welded into the structure. A rotating shaft 34 drives the wheel located below the scroll plate. In operation the acid sol and the alkaline silicate-zeolite slurries are pumped through the lines 30 and 31, into stationary troughs 35 and 36 and are mixed in the area 37 before being discharged from wheel 24 located below the scroll plate.

Our invention is illustrated by the following specific but nonlimiting examples.

EXAMPLE 1

An acid sol was prepared by mixing 43 lbs. of 40° Be sodium silicate with 38 lbs. of clay in 47 lbs. of water. The slurry was mixed rapidly with 5.6 gallons of 18° Be sulfuric acid. The resulting slurry had a pH of 1.8.

A zeolite containing slurry was made up by mixing 17 lbs. (dry basis) of a Type Y zeolite in the sodium form with 30 lbs. of clay and 41.1 lbs. of 40° Be sodium silicate in 18 lbs. of water. The two streams were fed independently under the pressure of 60 to 75 lbs./sq. in. to the mixing chamber of a mixing nozzle. Air was simultaneously fed to the mixing nozzle at a pressure of 81 p.s.i. The microspheres were collected at the nozzle outlet, purified, rare earth exchanged and dried. The product has the following characteristics:

| | |
|---|---|
| Total volatiles | 10.7% |
| Alumina | 30% |
| Silica | 62.7% |
| $Na_2O$ | 0.35% |
| Water pore volume | 0.36 |
| Nitrogen pore volume | 0.11 |
| Surface area | 144 $m^2/g$ |

The attrition was measured by the standard Davison and Jersey tests and found to have a Davison Attrition Index of 16 and a Jersey Attrition Index of 2.7. The Davison Attrition Index as referred to in this and the following examples is determined as follows: 7 g. sample is screened to remove particles from the 0 to 20 micron size range. The particles 20 microns and over are then subjected to a 5 hour test in a standard Roller Particle Size Analyzer using a 0.07 inch jet and 1 inch internal diameter U tube as supplied by the American Instrument Company, Silver Spring, Maryland. An air flow of 9 liters per minute is used. The Davison Index is calculated as follows: Davison Index is equal to 0-20 micron material formed during the test divided by original 20+ micron fraction multiplied by 100.

Our novel catalyst was evaluated by comparing the activity of these catalysts with the activity of a standard catalyst containing a calcined rare earth faujasite in a hydrogen form. In this comparison both catalysts are subjected to the standard activity test described by Ciapetta and Henderson in the Oil and Gas Journal of Oct. 16, 1967 on pages 88-93. The microactivity of our catalyst was 73 as compared to 71 for the standard. The product had an average particle size of 125 microns.

EXAMPLE 2

This example illustrates the method of preparing our catalyst using a spray machine rather than the spray nozzle of Example 1.

A silica sol was prepared by mixing 45 lbs. of a 40° Be sodium silicate having a silica to alumina ratio of 3.25, 60 lbs. of clay and 50 lbs. of water. Sulfuric acid (18° Be) was added to produce a hydrosol having a pH of 1.8.

The zeolite slurry was prepared by mixing 44 lbs. of 40° Be sodium silicate having a silica to alumina ratio of 3.25 to 1 with 12 lbs. of clay and 44 lbs. of a wet cake of a Type Y zeolite in the sodium form. The two slurries were pumped separately at a pressure of 25 lbs./sq. in. into a commercially available Bower Engineering No. AA spray machine (modified as shown in FIG. 3) and were atomized on a 7 inch CSE wheel. The wheel was maintained at a constant speed of 21,000 revolutions per minute. The microspheres as formed were forced through the spray dryer using air at ambient temperature and were collected in the microsphere collection zone. The microspheres as collected had a total volatile of 56.91 and a pH of 9.5. After purification, rare earth exchange and drying the product had the following characteristics:

| | |
|---|---|
| Total volatiles | 12.0% |
| Alumina | 34% |
| Silica | 64% |
| Na$_2$O | 0.25% |
| Water pore volume | 0.49 |
| Nitrogen pore volume | 0.25 |
| Surface area | 203 m$^2$/g |
| Pore diameter | 49 |
| Average bulk density | 0.65 |
| Davison Index | 16 |
| Jersey Index | 2.4 |
| Microactivity | 69.8 as compared to 71 for the standard |
| Average particle size | 125 microns |

EXAMPLES 3-8

A series of runs were completed using the processes described in Examples 1 and 2. The data collected as compared to the standard is set out in the table below.

TABLE I

| Run Number | Commercial CBZ1 Standard | 3 | 4 | 5 | 6 | 7 | 8 |
|---|---|---|---|---|---|---|---|
| T.V. after heating to 1750° F. | 12 | 10.2 | 9.8 | 14.9 | 13.5 | 10.5 | 30.7 |
| Al$_2$O$_3$, (Wt.%DB) | 28 | 31.1 | 30.5 | 36.2 | 29.4 | 30.0 | 22.0 |
| SiO$_2$, (Wt.%DB) | 65.0 | 63.4 | 61.8 | 61.6 | 65.0 | 66.5 | 73.0 |
| Na$_2$O, (Wt.%DB) | 0.9 | 0.57 | 0.65 | 0.25 | 0.98 | 0.46 | 0.58 |
| Re$_2$O$_3$, (Wt.%DB) | 4.0 | 4.4 | 5.4 | 1.9 | 4.5 | 2.9 | 3.6 |
| Pore Volume, H$_2$O (cc/g) | 0.45 | 0.43 | 0.45 | 0.50 | 0.48 | 0.57 | 0.58 |
| Pore Volume, N$_2$ (cc/g) | 0.35 | 0.21 | 0.26 | 0.27 | 0.35 | 0.38 | 0.37 |
| Surface Area, (M$^2$/g) | 250 | 217 | 227 | 176 | 298 | 259 | 381 |
| Average particle size (microns) | 70 | 71 | 84 | 88 | 69 | 88 | 144 |
| Davison Index | 30 | 55 | 60 | 32 | 61 | 51 | 22 |
| Jersey Index | 3.0 | 6.9 | 5.3 | 3.6 | 4.8 | 6.5 | 1.0 |
| Microactivity | 71 | 70.4 | 70.4 | 67 | 71 | 71 | — |

In Examples 3, 4, and 6 where the Davison indices were 55, 60 and 61, respectively, the surface areas were higher than for the standard and runs 1 and 2 (Examples 1 and 2). However, the microactivity of the product recovered from these runs compared favorably with the microactivity of the standard.

Another important characteristic of the product recovered from our process is the low sodium content. The Na$_2$O content was substantially lower than the Na$_2$O content of the standard in 6 of the 7 runs. This phenomenon is preferably due to the fact that since the product is dried at ambient temperature, the sodium is not as firmly bound into the structures as when the product is spray dried and exposed to much higher temperatures.

Run 8 is an example of a high silicate to clay ratio product. It is also an example of a run completed at a low pH (4.0). The Davison Index of the product is low, the surface area is significantly higher, while pore volumes are about the same. The alumina is significantly lower.

What is claimed is:

1. A process for manufacturing hydrocarbon conversion catalysts which comprises:
   (a) preparing a silica sol by mixing a sodium silicate solution with a sufficient quantity of an acidic component selected from the group consisting of acids, acid salts, and mixtures thereof to adjust the pH to about 0.5 to 3.3;
   (b) preparing a slurry of a crystalline alumino-silicate zeolite in water and adding a sufficient quantity of sodium silicate to bring the pH to above 10.0;
   (c) rapidly mixing the sol and the slurry to obtain a rapidly gelling reactant mixture;
   (d) spraying the reactant mixture into a gaseous atmosphere, said atmosphere being at ambient temperature and substantially 100% relative humidity, to obtain formed gelled particles of silica gel bound zeolite containing catalyst, whereby said formed particles are substantially completely gelled without removal of moisture therefrom; and
   (e) washing, drying and recovering the catalyst.

2. The process according to claim 1 wherein clay is added to the silica sol and slurry prior to mixing and spraying.

3. The process according to claim 2 wherein the clay is added to the silicate solution prior to addition of the acidic component.

4. The process according to claim 2 wherein clay is added to the zeolite slurry prior to mixing and spraying.

5. The process according to claim 1 wherein the pH of the silica sol is adjusted to a pH of 1.0 to 3.0 by the addition of sulfuric acid.

6. The process of claim 1 wherein said zeolite is selected from the group consisting of Type X and Type Y zeolites.

7. The process of claim 1 wherein said silica sol contains up to about 30% by weight alumina.

8. The process of claim 1 wherein said catalyst contains from about 10 to 30% by weight silica gel binder.

* * * * *